Nov. 22, 1955  S. LENART  2,724,186
ADJUSTABLE MICROMETER CALIPER
Filed April 7, 1952
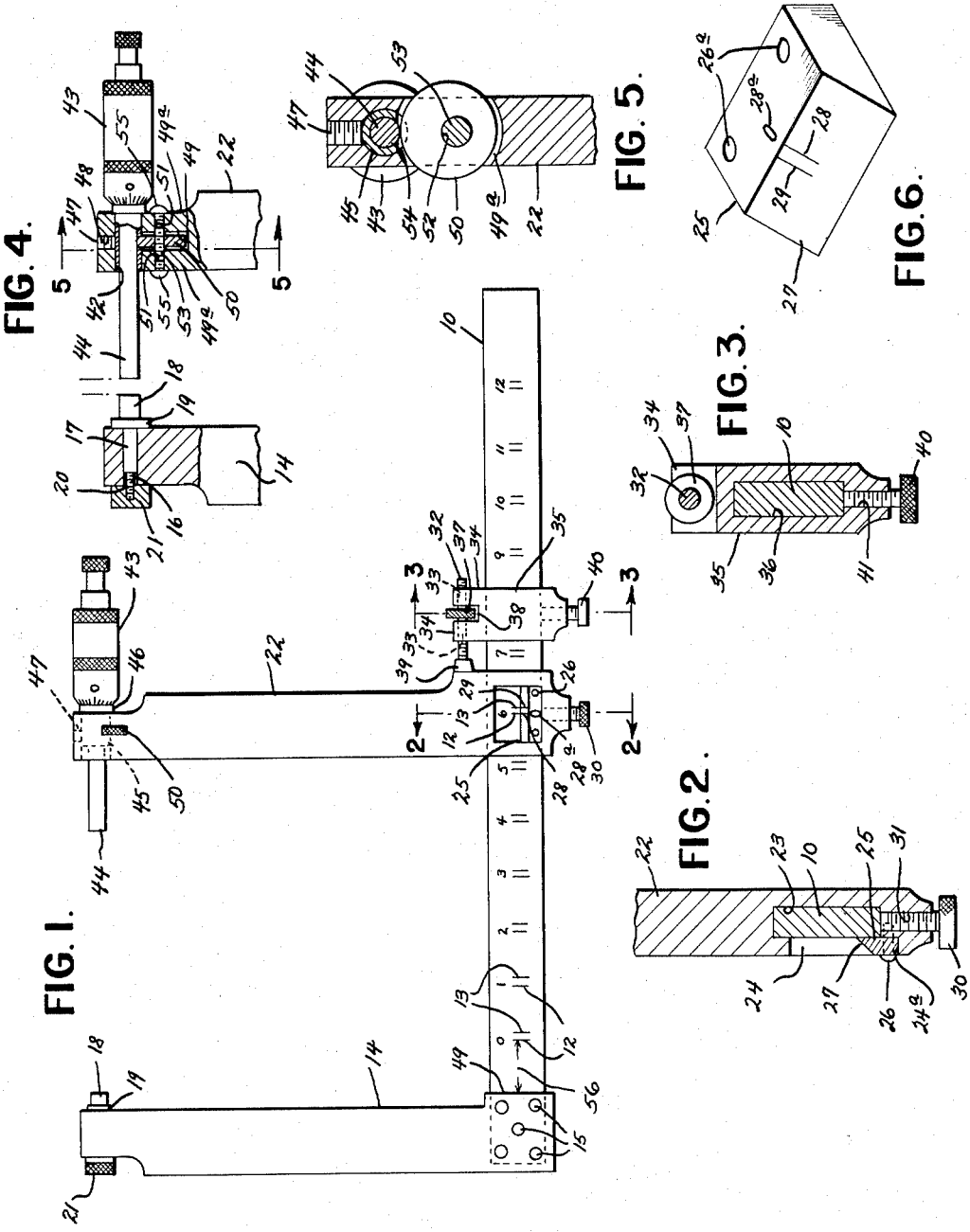
INVENTOR
STANLEY LENART
BY John A. Mackinney
ATTORNEY

United States Patent Office 2,724,186
Patented Nov. 22, 1955

2,724,186
ADJUSTABLE MICROMETER CALIPER
Stanley Lenart, North Tonawanda, N. Y.
Application April 7, 1952, Serial No. 281,019
7 Claims. (Cl. 33—165)

The present invention relates to improvements in an adjustable micrometer caliper and has for an object the provision of a device of this kind in which the scale bar has inscribed thereon a range comprising a plurality of sequentially arranged inch indicating indicia so that measurements of more than one inch may be easily made, for example, from one inch to twelve inches or more while the fractional part of an inch may be read directly on the micrometer caliper head in the same manner as in conventional micrometers.

Heretofore, measuring instruments of this kind made use of apertures, such as slots or grooves formed in the scale bar for cooperation with securing elements on the micrometer head and range indicator carrying arm for holding the micrometer head and range indicator in the proper position with respect to the scale on the scale bar. The readings obtained with such structures are not reliable as with use the walls of the apertures will wear down with the result that the micrometer head will not be in a true position with respect to the scale on the scale bar. This will be especially true since the apertures associated with some scale markings will be more frequently used so that the walls of the apertures will wear down an unequal amount.

It is an object of the present invention to eliminate these disadvantages of the prior art structures by providing locking means for the micrometer head and range indicator carrying arm which engages the side edges of the scale bar and does not require the formation of apertures of any kind in the scale bar.

Another object of the present invention is to provide an improved caliper in which an auxiliary graduation is associated with each of the main scale markings and the range indicator is provided with an auxiliary graduation associated with the zero marking on the range indicator in order to facilitate the accurate aligning of the selected main scale marking and the zero marking on the indicator.

A further object of the present invention is to provide a device of this kind in which an adjustment screw is provided for effecting fine adjustments of the micrometer head and range indicator carrying arm and there are provided locking means for the adjustment screw for accurately locking the screw in its true selected position.

A still further object of the present invention is to provide a precision measuring tool of simple construction, which can be used quickly and effectively, and one which will not be expensive to manufacture, so that all workers using precision measuring tools can afford to own one.

A further object of my invention is to provide an improved measuring tool to meet the demands of modern industries so that time wasting due to periodic shortage of micrometer calipers in machine shops and other allied industries will be eliminated.

The present invention aims to provide an improved tool in which eccentrically mounted means are provided for locking the micrometer spindle in its selected position.

With the foregoing and other objects in view, the invention will be hereinafter more fully described and more particularly pointed out in the appended claims.

In the drawings, in which the same parts are denoted by the same reference numerals throughout the several views:

Figure 1 is a front plan view of the improved device constructed in accordance with the present invention, Figure 2 is a sectional view taken on the line 2—2 of Figure 1, Figure 3 is a sectional view taken on the line 3—3 of Figure 1.

Figure 4 is an enlarged fragmentary front plan view of the outer end portions of the anvil carrying arm and the micrometer head and range indicator carrying arm with parts broken away and parts in section, Figure 5 is a sectional view taken on the line 5—5 of Figure 4, and Figure 6 is a perspective view of the range indicator.

Referring more particularly to the drawings, 10 indicates a scale bar which may be of any desired length, thickness and width and on the front face 11 thereof may be inscribed in any suitable manner a main scale comprising main scale markings 12 which may be equally spaced apart longitudinally of the bar in sequential order, from left to right looking at Figure 1 of the drawings.

An auxiliary graduation 13 is associated with each main scale marking 12 and each auxiliary graduation is spaced to the right of its main scale marking the same distance. For example, when the main scale markings are placed one inch apart, each auxiliary graduation may be placed .125 inch from its main scale marking.

An anvil carrying arm 14 has one end portion secured by rivets 15 or the like to the scale bar at its left end and outwardly of the first main scale marking 12. The arm 14 extends from the bar 10 and has in its free end portion a through passageway 16 of uniform diameter in which an anvil 17 may be removably mounted. Adjacent its head end 18 the anvil has a circular flange 19 and the opposite or tail end of the anvil is of reduced diameter and screw threaded as indicated at 20. A thumb nut 21 is received by the threaded portion 20 of the anvil. When the thumb nut 21 is screwed home the flange 19 will be drawn tight against the arm 14 and thus the anvil will be held securely.

A micrometer head and range indicator carrying arm 22 has a through passageway 23 in one end portion thereof for receiving therethrough the scale bar 10 so that the arm 22 may be slid longitudinally on the bar. An opening or window 24 may be formed in the front face of the arm 22 and communicates with the passageway 23 so that the main scale markings 12 and the auxiliary graduations 13 may be observed through the window. A range indicator 25 is mounted in a recess 24a which is a cut in the lower end portion of the front face of the arm 22 and opens into the lower end of the window 24. The indicator 25 may be secured to the arm 22 by fastening elements 26, such as screws or the like, which extend through holes 26a formed in the indicator. The indicator may be in the form of a thin steel plate and the upper portion thereof may be beveled upwardly and inwardly as at 27 towards the scale on the bar 10.

The range indicator also has formed on the beveled portion thereof a zero marking 28 and an auxiliary graduation 29. The zero marking 28 is located at the longitudinal center of the range indicator and has in line therewith a zero 28a formed on the lower portion of the indicator and the auxiliary graduation 29 is disposed to the right of the zero marking when looking at Figure 1 of the drawings and spaced .124 inch therefrom. A thumb screw 30 is received by a screw threaded bore 31 which opens through the lower end of the arm 22 and communicates with the lower portion of the passageway 23 so that the inner end of the screw 30 bears against the lower edge of the bar 10 to firmly clamp the arm 22 in its selected position when the thumb screw is screwed home.

In order to obtain fine and accurate adjustments of the range indicator 25 with respect to the scale on the scale bar 10, an adjustment screw 32 may be provided. The screw 32 extends through the aligned screw threaded bores 33 of the forks 34 of an adjustment screw clamp 35 which has a through passageway 36 for receiving therethrough the scale bar 10 so that the clamp 35 may slide longitudinally on the scale bar. A thumb nut or wheel 37 is rotatably mounted on the intermediate portion of the screw 32 and is received by the space 38 between the forks 34 of the clamp 35 so that bodily movement of the nut 37 longitudinally of the screw 32 is substantially negligible.

A head 39 is swively connected in a conventional manner to one end of the screw 32 and is secured to the adjacent side edge of the arm 22 in any suitable manner as by welding or the like. A thumb screw 40 is received by a screw threaded bore 41 which opens through the lower end of the clamp 35 and communicates with the lower portion of the passageway 36 so that the inner end of the screw 40 bears against the lower edge of the scale bar 10 to firmly clamp the clamp 35 in its selected position when the screw 40 is screwed home.

The arm 22 extends from the bar 10 and has in its free end portion a through passageway 42 of uniform diameter in which a one inch micrometer head 43 of the conventional type may be removably mounted. The micrometer head 43 has a shank or spindle 44, a barrel or sleeve 45 and a shouldered portion 46 and may be removably held in the passageway 42 by a headless set screw 47 which is received by a screw threaded opening 48 formed in the free end portion of the arm 22 and opening into the passageway 42. The inner end of the set screw 47 engages the barrel 45 of the micrometer head 43 when the shouldered portion 46 engages the arm 22 and the set screw 47 is screwed home.

It is frequently desirable to use the micrometer head 43 as a caliper or fixed gauge, for example, in connection with inspection work to check a great number of pieces to ascertain if they are of the same desired dimensions. For the purpose of securely locking the micrometer head in the desired adjusted position with respect to the arm 22 and with the anvil 17 after the arm 22 has been adjusted and locked in its adjusted position the following means are provided.

The arm 22 adjacent its outer free end is provided with a vertical or longitudinally extending slot 49 which opens through the front and rear faces of the arm 22 and opens into the passageway 42 substantially diametrically opposite to the opening 48. A lock nut 50 is rotatably mounted in the slot 49, the side walls 49a of which have horizontally aligned through screw threaded bores 51. The outer ends of the bores 51 open through the outer faces of the side walls 49a and the inner ends of the bores open into the slot 49. The lock nut 50 has an eccentrically disposed screw threaded hole 52 therethrough which registers with the bores 49a when the lock nut is positioned in the slot 49. A headless screw 53 is received by the hole 52 of the lock nut and the bores 49a.

The barrel 45 of the micrometer head 43 is cut away as at 54 to expose a portion of the spindle 44 so that when the lock nut is rotated to the position shown in Figures 4 and 5 of the drawings the lock nut will engage the spindle and the lock nut and spindle become locked by friction. A round headed cap screw 55 is received by the outer end portion of each bore 49a to close the outer ends of the bores. The lock nut may be rotated until it is free of the spindle 44 so that the spindle may be set to a different position for measuring pieces of a different size. In order to facilitate the rotation of the lock nut, its diameter may be larger than the width of the arm 22 so that portions of the periphery of the lock nut extend beyond the front and rear faces of the arm and the periphery of the lock nut may be rugose.

At 56 is indicated a set-off space on the scale bare 10 which is the distance between the zero main scale marking and the adjacent edge of the arm 14. The distance of this space is equal to one-half of the width of the portion of the arm 22 in which the window 24 is formed, plus the length of the projecting end of the micrometer spindle 44. There are two systems of range indicating, namely, the offset system used in the present invention and the direct system. In the direct system the zero is placed on the scale bar in a direct line with the face of the anvil and in the offset system the zero is placed on the scale bar at a distance of $^{27}\!/_{32}$ of an inch from the face of the anvil. In the direct system it is necessary to extend the arm 22 to the left looking at Figure 1 of the drawings and to cut off the winged portion at the lower right of the arm 22. The extended part of the arm would have to be made higher and lower to make allowance for the obstruction created by the extension of the arm, above and below the scale bar. The scale bar is $^{27}\!/_{32}$ of an inch longer in the offset system range indicating than the scale bar in the direct system range indicating so that the zero graduation is advanced on the scale bar $^{27}\!/_{32}$ of an inch from the direct system zero position whereby the offset system range indicator can be incorporated in this precision measuring tool.

The micrometer head is mounted in the micrometer head and the range indicator carrying arm according to the direct system and therefore the spindle extends in the opposite direction $^{27}\!/_{32}$ of an inch from the center position in the arm where the zero is located in the offset system range indicator; and in this manner a perfect counterbalance is obtained between micrometer head, the range indicator and the anvil so that while the actual measuring takes place $^{27}\!/_{32}$ of an inch to the left hand side from the zero graduation on the range indicator where the anvil and the spindle come in contact, the range shown on the micrometer head and in the range indicator is always exactly the same therefore this precision measuring tool is absolutely correct.

The offset system makes it possible to design a better looking tool.

The markings 12 and the graduations 13 may be precision machine cut in the scale bar 10. If the improved device is to be used to measure large cylindrical parts the adjustable micrometer caliper head and range indicator carrying arm 22 as well as the anvil carrying arm 14 should be made sufficiently long as indicated in Figure 1 of the drawings to permit the use of the largest range of the device. However, if only flat stock or small cylindrical parts are to be measured the arms 14 and 22 may be made much shorter.

The removable mounting means is provided for the anvil 17 so that when the anvil is worn down beyond repair it may be removed and a fresh anvil installed. It is preferable to use a heavy type micrometer head, such as indicated at 43 when constant measurements under trying conditions are being made but a lighter type micrometer head may be used. The micrometer head 43 may be adjusted for the ordinary wear in the same manner as a conventional type one inch micrometer head. However, as described above the micrometer head 43 may be removed and replaced by a fresh one when it becomes worn beyond repair.

In the use of the device, the adjustment screw 32 and clamp 35 are very useful in establishing a new range on the scale 10. For example, if a micrometer having a range of five inch to six inch is required, the arm 22 will be slid along the bar 10 so that the zero marking 28 on the range indicator 25 will approach the six inch marking on the scale bar. When the zero marking 28 and the six inch scale marking 12 are close together, the thumb screw 40 will be tightened to hold the clamp 35 stationary. The wheel 37 will then be rotated in the proper direction to move the adjustment screw 32 so that the arm 22 and the range indicator 25 will in turn be moved to bring the zero marking on the indicator into registry with the six inch scale marking on the scale bar as shown in Figure 1 of the drawings. The thumb screw 30 will now be screwed home to hold the arm 22 and the range indicator stationary. This will provide an adjustable micrometer caliper having a five to six inch range. The micrometer head may then be operated so as to get accurate measurements of five-inch or over articles up to six inches.

The auxiliary graduations 13 and 29 are placed to help the worker to determine whether or not he has established the range on the scale accurately. The auxiliary graduation 13 is placed on the scale .125 inch away from the one inch marking and the auxiliary graduation 29 is placed .124 inch away from the zero marking in the range indicator opening. Knowing that there is only .001 inch (one thousandth of an inch) difference between the auxiliary graduation on the scale and the auxiliary graduation in the range indicator opening, it is easy to form a positive orientation as to whether or not the marking 12 and the zero marking coincide exactly. Example Figure 1. When the six inch marking on the scale coincides exactly with the zero marking in the range indicator opening the auxiliary graduations will be .001 inch (one thousandth of an inch) apart, and there will be small deviation between these graduations, but when the auxiliary graduations coincide the six inch marking is inaccurate by .001 inch (one thousandth of an inch) and there will be a small deviation between the six inch marking on the scale and the zero marking in the range indicator opening.

The improved device may be made in various sizes, such as, zero to six inches, zero to twelve inches, zero to eighteen inches, zero to twenty-four inches, and upwards. In the larger sizes the scale bar and the other parts with the exception of the anvil and the micrometer head would have to be made of larger cross-section to given sufficient rigidity.

It is obvious that various changes and modifications may be made in the details of construction and design of the above specifically described embodiment of this invention without departing from the spirit thereof, such changes and modifications being restricted only by the scope of the following claims.

What I claim is:

1. An adjustable micrometer caliper comprising a scale bar having spaced apart scale markings thereon, an anvil carried by said bar, an arm slidably carried by said bar, a micrometer head on said arm, a separate beveled range indicator on said arm and having a zero marking thereon adapted to be brought into registry with one of the scale markings on said bar upon movement of said arm, means for detachably mounting said range indicator directly on said arm, means for locking and unlocking said arm to said bar comprising a thumb screw movably carried by said arm for engaging and disengaging one side of said bar, said arm having an opening through which the scale markings may be viewed and in which the range indicator is mounted, said indicator comprising a plate having its upper portion beveled, said zero marking being formed on said beveled portion, said range indicator mounting means adapted to removably secure said indicator to said arm in said opening so that said upper beveled portion slides smoothly over the scale bar to set the device at any range desired and so that said indicator is positioned in said opening and that said zero marking is disposed at the longitudinal center of said arm.

2. An improved adjustable micrometer caliper as claimed in claim 1 characterized by the fact that said scale bar is provided with an orientation graduation associated with and spaced from and parallel to each scale marking, and that the beveled portion of said indicator is provided with an orientation graduation parallel to its zero graduation and spaced therefrom a distance different than that between each scale marking and its orientation graduation.

3. An improved adjustable micrometer caliper comprising a scale bar having spaced apart scale markings thereon, an anvil carrying arm on said bar adjacent the initial scale marking thereon, an anvil on said arm, a second arm slidably mounted on said bar, a range indicator on said second arm and having a zero marking disposed at the center of the width of said second arm, said zero marking adapted to be brought selectively into registry with one of said scale markings, and a micrometer head on said second arm and having a spindle for cooperating with said anvil to measure parts, said bar having a set-off space between the face of said anvil and the initial scale marking on said bar and extending from the vertical plane containing the face of the anvil to the initial scale marking on the bar so that the length of the set-off space is equal to the horizontal distance from the face of the anvil to the initial scale marking on the bar and said micrometer head projecting from the center of said second arm in a direction towards said initial scale marking a distance equal to said set-off space for a given setting of said micrometer head with respect to the center of said second arm.

4. An improved adjustable micrometer caliper comprising a scale bar having uniformly spaced apart scale markings thereon and an orientation graduation associated with, spaced from and parallel to each scale marking, an anvil on said bar, an arm slidably mounted on said bar, a micrometer head on said arm and cooperating with said anvil to measure parts, and a separate range indicator removably mounted on said arm and having a zero marking thereon to be brought into registry selectively with one of said scale markings upon sliding movement of said arm and having an orientation graduation parallel to the zero marking and spaced therefrom a distance different from that between each scale marking and its orientation graduation.

5. An improved micrometer caliper comprising a scale bar, an anvil on said bar, an arm on said bar and having a through passageway of uniform diameter, a micrometer head having a shank of reduced diameter and a sleeve surrounding a portion of said shank, said sleeve and shank extending through said passageway, said sleeve having a shoulder engaging against said arm, said arm having a screw threaded opening communicating with said passageway, and a headless set screw received by said opening to engage the sleeve of said micrometer head when the headless set screw is screwed home to removably hold the micrometer head in said passageway, said micrometer head having means for adjusting said shank with respect to said arm, and cam means cooperating with the shank for holding said shank in its adjusted position.

6. An improved adjustable micrometer caliper as claimed in claim 5 characterized by the fact that a slot is provided in said arm communicating with said passageway, that said sleeve has a cut away portion exposing a portion of said shank to said slot, and that a lock nut is eccentrically and rotatably mounted in said slot so that in one position the lock nut frictionally engages the shank to lock it in its adjusted position.

7. An improved adjustable micrometer caliper comprising a support having a through passageway, a micrometer head having a spindle and a barrel surrounding said spindle, said spindle and barrel extending through said passageway, said support having a slot therein opening into said passageway, said barrel having a cut away portion exposing a portion of said spindle to said slot, said support having screw threaded bores opening into said slot and through the outer faces of said support, a headless screw received by said bores and extending through said slot, a lock nut in said slot and having an eccentrically disposed screw threaded hole therethrough for receiving said headless screw, and a cap screw received by the outer end portion of each bore.

References Cited in the file of this patent

UNITED STATES PATENTS

| | | |
|---|---|---|
| 403,726 | Bellows | May 21, 1889 |
| 427,956 | Bellows | May 13, 1890 |
| 826,883 | Prewett | July 24, 1906 |
| 1,355,724 | Zhukoff | Oct. 12, 1920 |
| 1,393,266 | Cousins | Oct. 11, 1921 |
| 1,414,550 | Cluley | May 2, 1922 |
| 1,512,823 | Darlington | Oct. 21, 1924 |
| 1,638,366 | Sandoz | Aug. 9, 1927 |
| 2,304,265 | Magyari | Dec. 8, 1942 |
| 2,572,999 | Elliott | Oct. 30, 1951 |
| 2,611,967 | Bennett | Sept. 30, 1952 |

FOREIGN PATENTS

| | | |
|---|---|---|
| 40,298 | Germany | Oct. 23, 1886 |
| 487,375 | Great Britain | June 20, 1938 |